United States Patent

[11] 3,617,814

| [72] | Inventor | Harris I. Stanback<br>Lexington, Ky. |
|---|---|---|
| [21] | Appl. No. | 15,370 |
| [22] | Filed | Mar. 2, 1970 |
| [45] | Patented | Nov. 2, 1971 |
| [73] | Assignee | Square D Company<br>Park Ridge, Ill. |

[54] CONCEALED-HINGE MOUNTING FOR RAINTIGHT COVER OF MULTIMETERING ELECTRICAL PANELBOARD
10 Claims, 5 Drawing Figs.

[52] U.S. Cl. .................................................. 317/106,
49/398, 312/100
[51] Int. Cl. ....................................................... H02b 9/00,
E05d 7/00
[50] Field of Search........................................... 49/397,
398, 402; 312/100, 138 A, 138 R, 291;
317/104-111

[56] References Cited
UNITED STATES PATENTS
2,656,948 10/1953 McGee.......................... 312/100 X

| 3,087,097 | 4/1963 | Janson.......................... | 317/104 X |
| 3,479,104 | 11/1969 | Kobryner...................... | 312/100 X |

FOREIGN PATENTS
| 688,138 | 6/1964 | Canada......................... | 317/104 |

Primary Examiner—Lewis H. Myers
Assistant Examiner—Gerald P. Tolin
Attorneys—Harold J. Rathbun and Paul J. Rose ABSTRACT: A circuit breaker compartment in a column of watt-hour meter socket compartments is partially defined by a pair of vertically spaced, horizontally extending partitions. A mounting bracket secured to an upper one of the partitions has a depending rear portion and a pair of spaced depending front leg portions. An interior trim panel is secured to the rear portion of the bracket and anchored in a lower one of the partitions. A front cover having a pair of horizontally spaced slots in an upper edge portion is mounted on the front leg portions of the bracket and secured in closed position by a screw extending through a lower edge portion of the cover into threaded engagement with the interior trim panel. The slotted upper edge portion of the cover is normally covered by a depending lip portion of a front cover for a meter socket compartment spaced immediately above the circuit breaker compartment.

PATENTED NOV 2 1971 3,617,814

*INVENTOR.*
HARRIS I. STANBACK

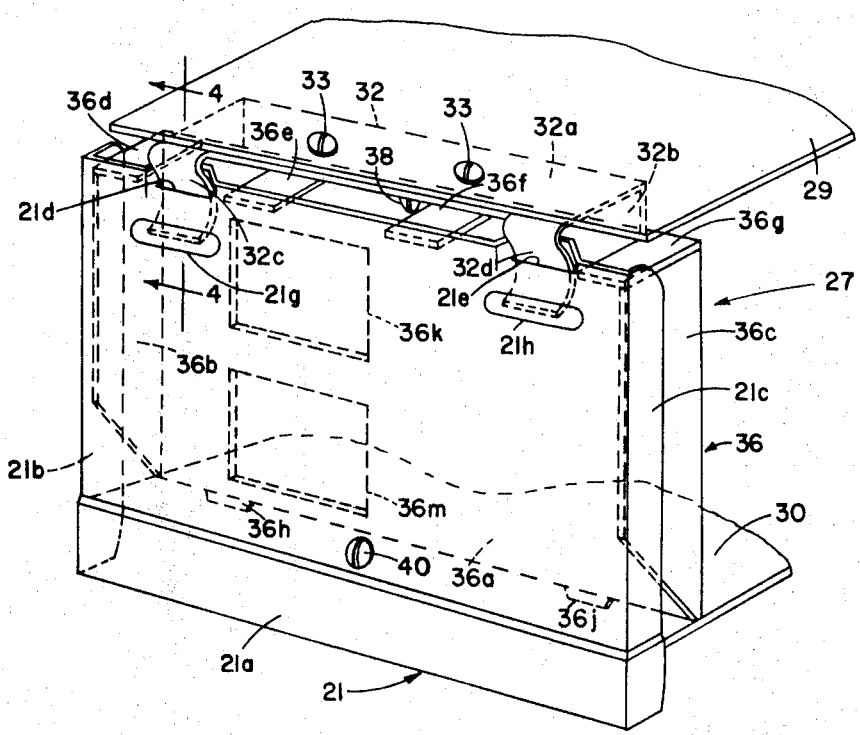
FIG. 3
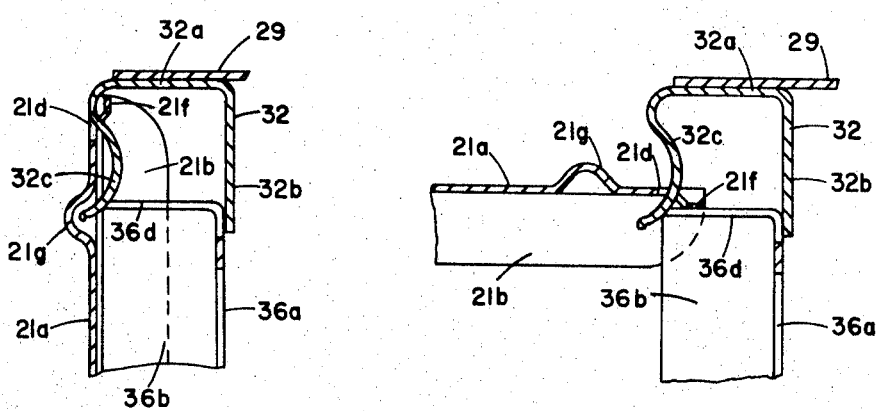
FIG. 4
FIG. 5
INVENTOR.
HARRIS I. STANBACK

CONCEALED-HINGE MOUNTING FOR RAINTIGHT COVER OF MULTIMETERING ELECTRICAL PANELBOARD

This invention relates to a concealed-hinge mounting for a raintight cover of a circuit breaker compartment in a multimetering electrical panelboard of the type disclosed and claimed in application, Ser. No. 120,476 filed Mar. 3, 1971, and assigned to the assignee of this application.

Prior raintight covers of compartments for switches, fuses, circuit breakers, and the like of electrical metering panelboards had exposed hinges which detracted in appearance and were subject to deterioration from exposure.

An object of the invention is to provide a concealed-hinge mounting for a raintight cover of a circuit breaker compartment in a multimetering electrical panelboard.

Another object is to provide an improved mounting for an interior trim panel of a circuit breaker compartment in a multimetering electrical panelboard.

Other objects and advantages will become apparent when the following specification is considered along with the accompanying drawings in which:

FIG. 3 is a fragmentary perspective view of the structure of FIG. 2;

FIG. 4 is a fragmentary sectional view taken in the direction of arrows 4—4 of FIG. 3; and FIG. 5 is a view similar to FIG. 4, but with a front cover in an open position.

Figure 1:
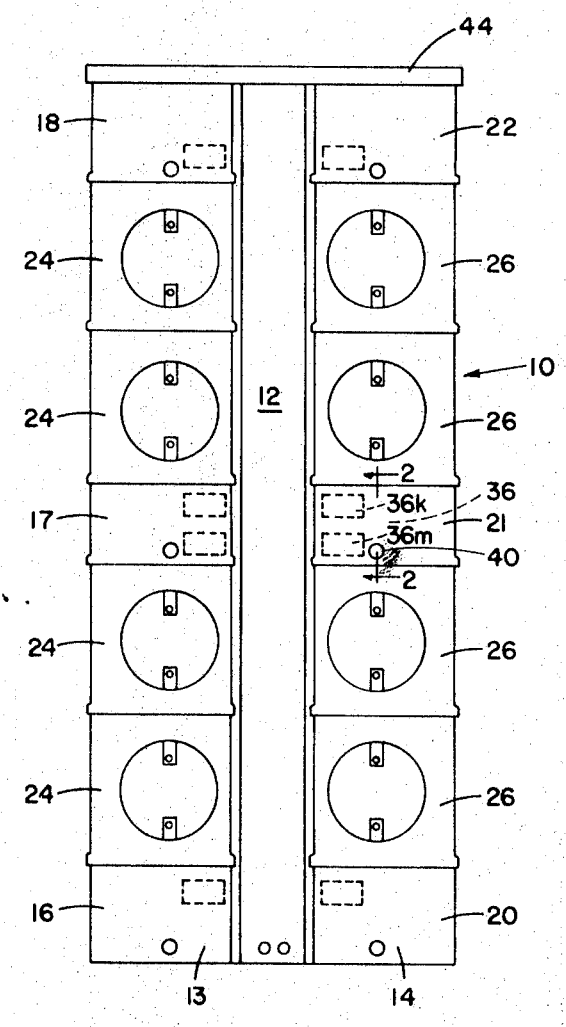
FIG. 1 is a front view of a multimetering service entrance electrical panelboard constructed in accordance with the invention.

FIG. 1 shows a front view of a multimetering electrical panelboard 10 having a covered central wiring trough 12 disposed between right and left vertical columns 13 and 14 of watt-hour meter socket compartments and circuit breaker compartments. For a general description of a multimetering electrical panelboard, reference may be had to U.S. Pat. No. 3,366,845 issued on Jan. 30, 1968.

The column 13 contains lower, center, and upper circuit breaker compartments respectively having covers 16, 17, and 18. Similarly, the column 14 contains lower, center, and upper circuit breaker compartments respectively having covers 20, 21 and 22. Two meter socket compartments provided respectively with covers 24 are disposed both between the circuit breaker compartments respectively having covers 16 and 17 and also between the circuit breaker compartments respectively having covers 17 and 18. Similarly, two meter socket compartments provided respectively with covers 26 are disposed both between the circuit breaker compartments respectively having covers 20 and 21 and also between the circuit breaker compartments respectively having covers 21 and 22. The covers 24 and 26 are secured in place in any suitable manner, such as by brackets welded to the inner surfaces thereof and bolted to structural members in the compartments.

The invention will be described with reference to a circuit breaker compartment 27 (FIGS. 2 and 3) having the cover 21. The compartment 27 is partially defined by a pair of vertically spaced generally flat horizontally disposed interior partition walls 29 and 30 secured in a suitable manner to a rear wall of an open-front box (not shown) forming an enclosure of the panelboard 10. A bracket 32 is secured to the partition wall 29 by a pair of screws 33 and nuts 34. The bracket 32 includes an elongated generally rectangular horizontally disposed flat portion 32a secured to the undersurface of a front edge portion of the partition wall 29, a generally flat vertically disposed depending rear portion 32b, and a pair of horizontally spaced generally S-shaped depending front leg portions 32c and 32d including curved free end portions concave on their respective outer sides and convex on their respective inner sides.

The cover 21 includes a generally flat front panel 21a and a pair of opposed side flanges 21b and 21c. The panel 21a and the side flanges 21b and 21c are outwardly expanded adjacent their lower ends so as to fit over corresponding upper edge portions of the cover 26 immediately below. The panel 21a is provided with a pair of horizontally spaced slots 21d and 21e at its upper edge portion for reception of the leg portions 32c and 32d. A portion 21f (FIGS. 4 and 5) of the panel 21a above the slot 21d is inwardly offset. The portion of the panel 21a above the slot 21e is similarly inwardly offset. Respectively below the slots 21d and 21e, the panel 21a is provided with a pair of horizontally spaced outward embossments 21g and 21h to provide a corresponding pair of inner cavities for reception respectively of the free ends of the leg portions 32c and 32d when the cover 21 is in closed position. The portion of the cover 21 having the slots 21d and 21e slides downwardly along the outwardly concave inwardly convex free end portions of the leg portions 32c and 32d as the cover is moved from the closed position of FIGS. 2, 3, and 4 to the open position of FIG. 5.

An interior trim panel 36 (FIG. 3) includes a flat generally rectangular panel 36a, a pair of opposed side flanges 36b and 36c, and four horizontally spaced, upper flange portions 36d, 36e, 36f, and 36g, the flange portions 36d and 36e being respectively on opposite sides of the leg portion 32c, and the flange portions 36f and 36g being respectively on opposite sides of the leg portion 32d. The panel 36a is provided at its lower edge with a pair of horizontally spaced tabs 36h and 36j which extend through appropriate slots in the partition wall 30. By means of a screw 38 (FIG. 2) the panel 36a is secured at its upper edge portion to the rear portion 32b of the bracket 32. A pair of vertically spaced rectangular openings 36k and 36m is provided in the panel 36a respectively for the reception of the operating handles of a pair of circuit breakers (not shown) and surrounding portions of the casings.

The cover 21 is mounted on the leg portions 32c and 32d by insertion thereon respectively through the slots 21d and 21e from the outer surface of the cover, as can be visioned most clearly from inspection of FIG. 5. With the cover in an open position, the interior trim panel 36 is secured in place, and the cover is thereby trapped on the leg portions 32c and 32d by the upper flange portions 36d, 36e, 36f, and 36g.

A screw 40 (FIGS. 2 and 3) extending through a hole in the panel 21a of the cover 21 and retained thereon by a retaining washer 41 is threaded into a hole in the panel 36a of the interior trim panel 36 to secure the cover 21 in a closed position. A washer 42 is provided on the screw 40 on the outside of the cover to protect the surface thereof as the screw is tightened.

Figure 2:
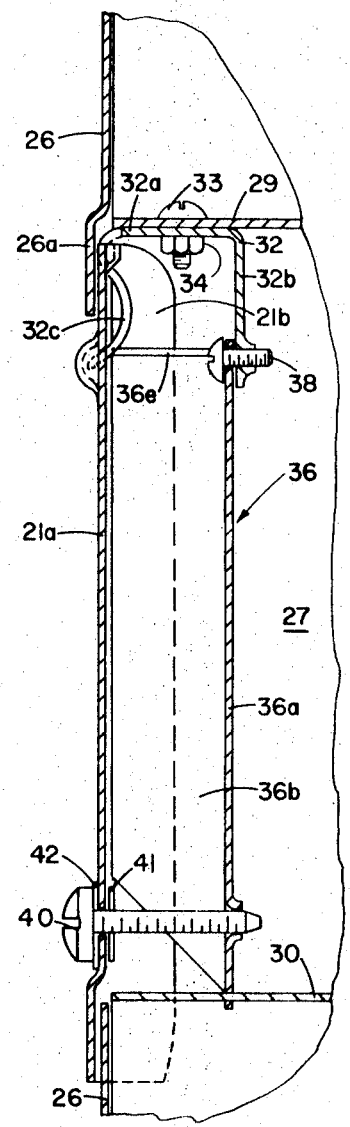
FIG. 2 is a fragmentary sectional view taken along the line 2—2 of FIG. 1.

As notable in FIG. 2, the cover 26 of the meter socket compartment above the circuit breaker compartment 27 has a depending lip 26a which extends below the partition wall 29 and over the slots 21d and 21e of the cover 21. The construction is thus raintight, and the "hinges" of the cover 21 are concealed when the cover is closed. The curved free end portions of the leg portions 32c and 32d aid in this concealment, because, as the cover is closed, the slotted portion moves upwardly along the curved free end portions into concealed position behind the lip 26a.

For the circuit breaker compartments respectively having the covers 18 and 22, the depending lip comparable to the lip 26a and the wall comparable to the partition wall 29 are parts of a top cover 44 for the panelboard 10, and a pair of brackets such as the bracket 32 is welded to the undersurface of the cover 44.

I claim:

1. A multimetering electrical panelboard comprising a circuit breaker compartment partially defined by a pair of vertically spaced generally flat horizontally disposed wall portions, a bracket secured to an upper one of the wall portions, the bracket having a depending front leg portion including a curved free end portion concave on an outer side and convex on an inner side, a cover pivotally mounted on the front leg portion for movement between open and closed positions, the cover having a slot in an upper edge portion for receiving the front leg portion and the front leg portion extending through the slot from a front surface of the cover, and a second cover disposed above the first-mentioned cover and having a portion extending downwardly in covering relation to the slot in the first-mentioned cover when the first-mentioned cover is in closed position.

2. An electrical panelboard as claimed in claim 1 wherein the second cover is a cover for a meter socket compartment disposed above the circuit breaker compartment.

3. An electrical panelboard as claimed in claim 1 wherein the second cover is a top cover for the panelboard.

4. An electrical panelboard as claimed in claim 1 wherein the bracket has a depending rear portion and including an interior trim panel secured to the depending rear portion and to a lower one of the wall portions.

5. An electrical panelboard as claimed in claim 4 wherein the interior trim panel has a pair of horizontally spaced flange portions disposed respectively on opposite sides of the front leg portion of the bracket.

6. An electrical panelboard as claimed in claim 4 including a screw extending through the first-mentioned cover and threaded into the interior trim panel to secure the cover in closed position.

7. An electrical panelboard as claimed in claim 1 wherein the first-mentioned cover has a pair of horizontally spaced slots in the upper edge portion and the bracket has a pair of horizontally spaced depending front leg portions extending respectively through the slots from the front surface of the cover.

8. An electrical panelboard as claimed in claim 7 wherein the bracket has a depending rear portion and including an interior trim panel secured to the depending rear portion and to a lower one of the wall portions.

9. An electrical panelboard as claimed in claim 8 wherein the interior trim panel has two pairs of horizontally spaced upper flange portions, each of the front leg portions of the bracket having a pair of the upper flange portions of the interior trim panel disposed respectively on opposite sides thereof.

10. An electrical panelboard as claimed in claim 7 wherein the front leg portions of the bracket are generally S-shaped.

* * * * *